United States Patent
Szilagyi et al.

(10) Patent No.: US 9,572,119 B2
(45) Date of Patent: Feb. 14, 2017

(54) UNIQUE CONNECTION IDENTIFIER

(71) Applicant: NOKIA SOLUTIONS AND NETWORKS OY, Espoo (FI)

(72) Inventors: Peter Szilagyi, Budapest (HU); Csaba Vulkan, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 127 days.

(21) Appl. No.: 14/327,810

(22) Filed: Jul. 10, 2014

(65) Prior Publication Data
US 2016/0014710 A1    Jan. 14, 2016

(51) Int. Cl.
H04W 56/00    (2009.01)
H04L 29/06    (2006.01)
H04L 29/12    (2006.01)

(52) U.S. Cl.
CPC ...... H04W 56/0005 (2013.01); H04L 61/2503 (2013.01); H04L 69/14 (2013.01); H04L 69/16 (2013.01); H04L 69/28 (2013.01)

(58) Field of Classification Search
None
See application file for complete search history.

(56) References Cited

U.S. PATENT DOCUMENTS

2006/0215684 A1* 9/2006 Capone ............... H04L 63/029
370/437
2008/0101413 A1 5/2008 Bardalai et al.
2013/0138822 A1* 5/2013 Hu .................. H04L 65/1069
709/227
2015/0358879 A1* 12/2015 Diachina ........... H04W 36/0066
370/332

FOREIGN PATENT DOCUMENTS

WO    WO 2006/096538 A1    9/2006

OTHER PUBLICATIONS

International Search Report and Written Opinion dated Sep. 23, 2015 corresponding to International Patent Application No. PCT/EP2015/065677.

* cited by examiner

*Primary Examiner* — Christopher Crutchfield
*Assistant Examiner* — Alan Lindenbaum
(74) *Attorney, Agent, or Firm* — Squire Patton Boggs (US) LLP

(57) ABSTRACT

Systems, methods, apparatuses, and computer program products for a connection identification scheme are provided. One method includes determining, for example by an information receiver, a unique connection identity for an off-band connection with an information provider. The unique connection identity may be based on information related to a user plane connection with the information provider. The method may further include storing the unique connection identity, receiving radio access network information and synchronization information from the information provider, and synchronizing at least part of the radio access information with at least part of information sent in the user plane connection, using the synchronization information.

23 Claims, 9 Drawing Sheets

UNIQUE CONNECTION IDENTIFIER

TECHNICAL FIELD

Example embodiments of the invention generally relate to mobile communications networks or systems, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), WCDMA/HSPA, EDGE, GPRS, as well as WLAN/Wi-Fi radio access networks, etc.

BACKGROUND

A radio access network (RAN) may be considered part of a mobile communications system and implements a radio access technology. The RAN may reside between a device such as a mobile phone or device, a computer, or any remotely controlled machine and provides connection with its core network (CN).

For example, Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Further releases of 3GPP LTE (e.g., LTE Rel-10, LTE Rel-11, LTE Rel-12) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the example embodiments of systems, methods, apparatuses, and computer program products for a connection identification scheme, as represented in the attached figures, is not intended to limit the scope of the invention, but is merely representative of selected example embodiments of the invention.

The features, structures, or characteristics of the invention described throughout this specification may be combined in any suitable manner in one or more example embodiments. For example, the usage of the phrases "certain example embodiments," "some example embodiments," or other similar language, throughout this specification refers to the fact that a particular feature, structure, or characteristic described in connection with the example embodiment may be included in at least one example embodiment of the present invention. Thus, appearances of the phrases "in certain example embodiments," "in some example embodiments," "in other example embodiments," or other similar language, throughout this specification do not necessarily all refer to the same group of example embodiments, and the described features, structures, or characteristics may be combined in any suitable manner in one or more example embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and example embodiments of this invention, and not in limitation thereof.

Efficient content delivery (e.g., from over the top (OTT) content servers) to mobile devices (e.g., data consumers) requires that the data transfer is optimized to the actual radio access network (RAN) conditions, that is, the content servers could use the network side insight to enhance their delivery mechanisms. The capability of providing up-to date and relevant information on the RAN conditions has become the basic enabler of optimized content delivery to mobile devices. Examples may include transport control protocol (TCP)/content optimization based on available bandwidth information (e.g., throughput guidance), location aware services based on the cell identifier (ID), etc.

Figure 1:
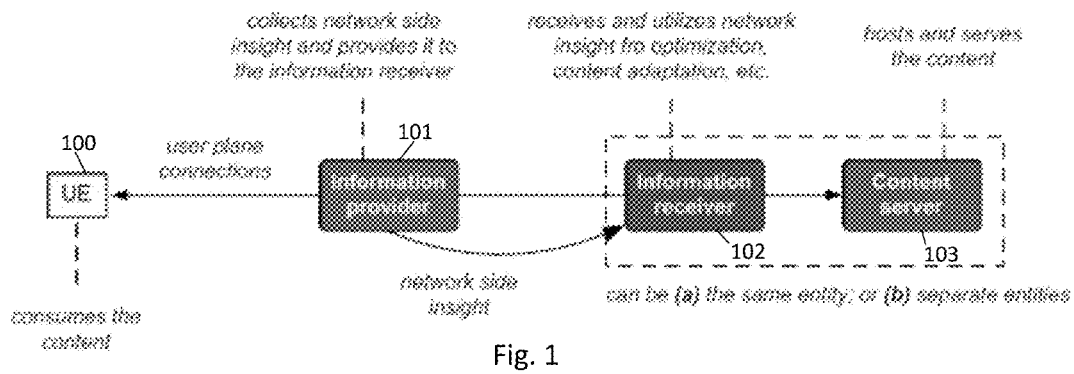
FIG. 1 illustrates a block diagram of a system, according to one example embodiment.

A valid implementation may require the availability of a network side entity (i.e., information provider) capable of collecting and providing the relevant insight to an entity (i.e., information receiver) capable of receiving, interpreting and using the received insight in its operation (e.g., optimization, content adaptation, etc.). FIG. 1 illustrates an example embodiment of a block diagram depicting the logical entities involved in the communication, including a UE 100, information provider 101, and information receiver 102.

Figure 2A:
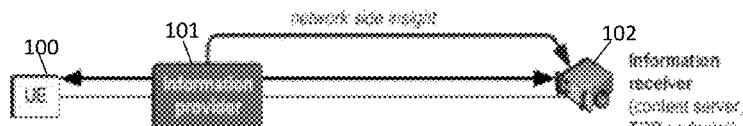
FIGS. 2a-2b illustrate a block diagram of a system, according to another example embodiment.
Figure 2B:
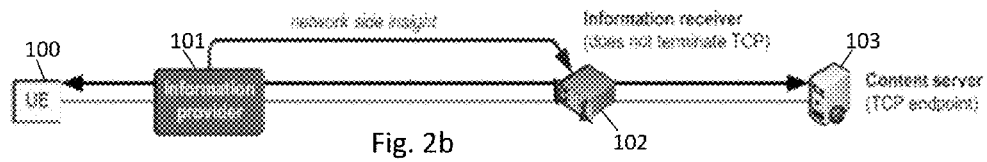

As illustrated in the example of FIG. 1, the information receiver 102 can be either a standalone middle box with the role to execute the required actions based on the received insight or can be a software/hardware entity attached to or running at the content server 103. In the latter case, the content server 103 itself may receive the network side insight and perform the required optimization (e.g., on TCP or content level). In case of information receiver 102 being a middle box, that is, an intermediate adaptation gateway which performs on-the-fly optimization on the content served by a separate content server 103, the optimization may even be transparent to the original content server. FIGS. 2a and 2b illustrate the possible alternative relationships between the information receiver 102 and the content server, according to example embodiments. In particular, FIG. 2a illustrates an example where the information receiver 102 and content server 103 are the same entity. FIG. 2b illustrates an example where the information receiver 102 and content server 103 are separate entities.

The network side insight exposed by the information provider is usually associated with a given user plane connection, e.g., a single TCP connection, or a set of TCP connections (e.g., that are established in the same radio bearer or used by the same application to transfer the requested content). There are two valid alternatives to convey information from the provider to the receiver: in-band and off-band mechanisms. The in-band mechanisms can use protocol header enrichment, i.e., inserting additional bytes into the TCP, internet protocol (IP) or hypertext transfer protocol (HTTP) headers of the uplink user plane packets. A benefit of these mechanisms is that the packet itself carries the full context of the enriched information. That is, the connection to which it applies can be trivially identified based on the transport layer ports and IP addresses of the same packet that carries the additional enriched data. Accordingly, the only information the provider must communicate to the receiver is the piece of information with the added value only (e.g., the throughput guidance) and thus the overhead is minimal.

Alternatively, whenever in-band mechanisms are not suitable, an off-band connection can be established between the provider and receiver in order to convey the required information in this case decoupled from the in-band packets. These off-band communication scenarios are illustrated in the example of FIG. 3. The off-band mechanism is an available solution in case the delivery of the in-band header enrichment is not guaranteed due to intermediate devices (e.g., firewalls) that are stripping off the extra information. Off-band mechanism is also available in case the information provider is not an in-line network element, i.e., it only receives a copy of the user plane packets but it is not in a position to insert modified packets back into the primary data stream (i.e., to do header enrichment). Additionally, off-band is an available communication mechanism between the information provider and receiver in case the user plane packet flow is not bidirectional (e.g., a downlink user datagram protocol (UDP) streaming instead of a TCP connection) with no related uplink packets suitable to carry additional enriched information.

Figure 3A:
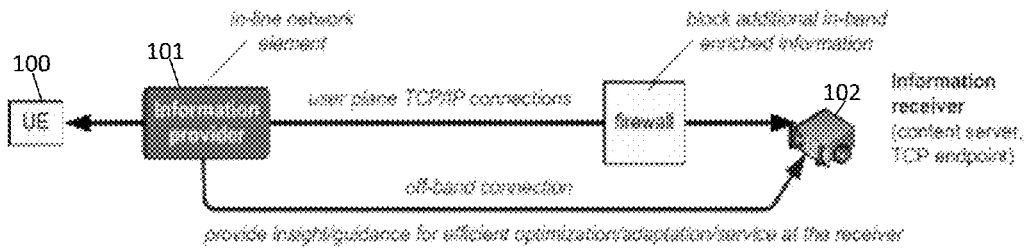
FIGS. 3a, 3b, and 3c illustrate a block diagram of a system, according to another example embodiment.
Figure 3B:
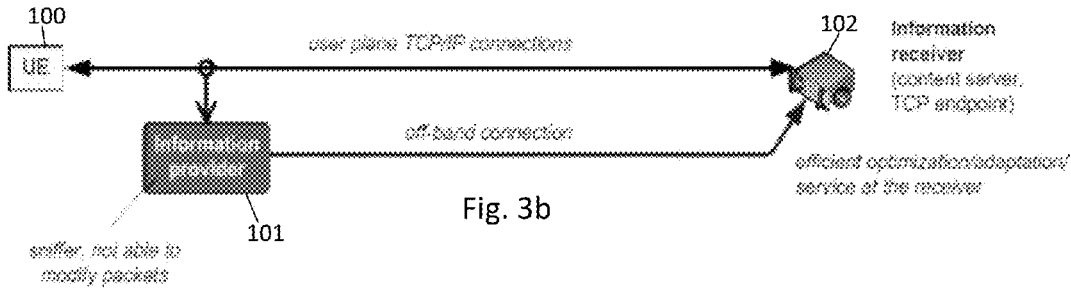
Figure 3C:
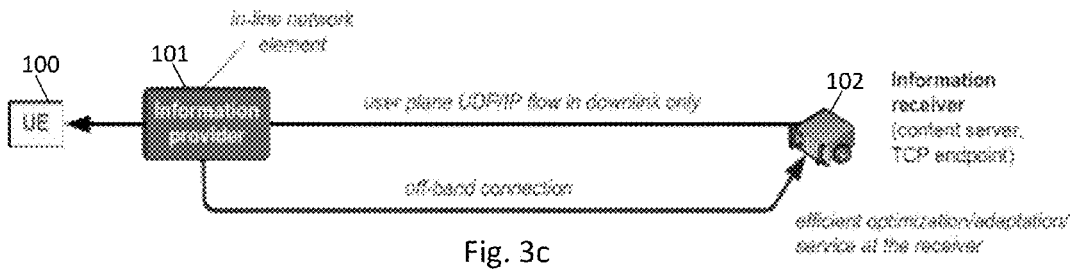

FIG. 3a illustrates a block diagram of an off-band communication scenario in which in-band information is blocked; FIG. 3b illustrates a block diagram of an off-band communication scenario in which packet enrichment is not possible; and FIG. 3c illustrates a block diagram of an off-band communication scenario in which there is no uplink packet flow to carry enriched information.

The off-band communication, however, raises two problems that are addressed and solved by example embodiments of the present invention. First, as the transferred information is decoupled from the user plane packets, the off-band information should additionally include a unique ID of the corresponding user plane connection (e.g., the TCP/UDP/IP port/address tuple), which identifies the connection for both endpoints of the off-band communication (i.e., the information provider and receiver). In principle, the identity of the user plane connections can be established between the information provider and receiver in two ways. For example, they could negotiate an identity for each new connection using an additional off-band protocol. However, this would already require that in the negotiation they are able to reference the connection in question, which would imply that the very identity being negotiated has already been created.

Therefore, the feasible way to obtain the per connection identity is to resort to the information present in the user plane packets and protocol headers natively, without additional enriched in-band information. The straightforward connection identity is the tuple including the IP addresses and TCP/UDP ports. In the presence of Network Address Translation (NAT), however, this is not usable as the UE IP address and port are seen differently by the information provider and receiver. Accordingly, a solution is needed that draws the connection identity from other protocol fields that are not altered by middle boxes such as NATs, firewalls, etc.

A second challenge that needs to be solved with the off-band communication is that the off-band information may be delayed or advanced compared to the in-band packets to which the information refers to. Therefore, an additional synchronization mechanism is needed to map the off-band information to the in-band packets or the status of the in-band connections. This is referred to as the in-band/off-band information synchronization problem.

Example embodiments of the invention provide at least a solution to the challenges of the off-band mechanism outlined above. Certain example embodiments provide a mechanism to create a unique identity for each connection by utilizing those existing protocol fields that are not altered by the NAT. One example embodiment provides the identification and synchronization mechanisms for TCP connections, as TCP is the most frequently used transport layer protocol on the Internet. However, other example embodiments can also be adapted to additional protocols above user datagram protocol (UDP) that fulfil the above requirements, such as the Real Time Protocol (RTP), for instance.

For TCP connections, the controlled selection of the initial sequence number and TimeStamp values makes the combination of these fields into a unique per connection identity. These fields are not altered by the NAT or other middle-boxes, thus they are visible identically to both the information receiver and the information provider. Example embodiments also provide a synchronization mechanism to make sure that the information receiver can interpret the off-band information in context. Finally, certain example embodiments also provide a management mechanism for the off-band connection itself.

Figure 4:
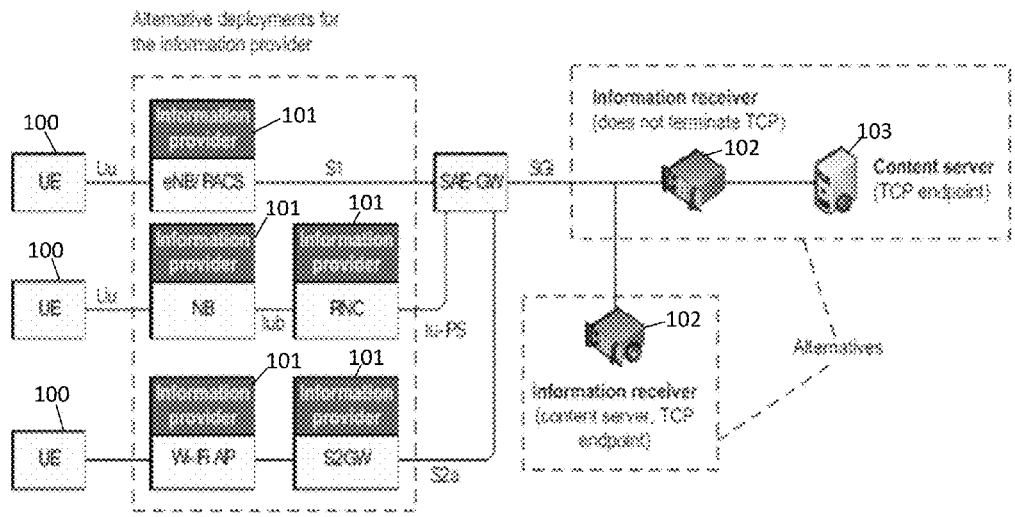
FIG. 4 illustrates a block diagram of a system, according to another example embodiment.

Example embodiments of the invention may apply to all generations of mobile systems (e.g. LTE, WCDMA/HSPA, UMTS, EDGE, GPRS, etc.) as well as WLAN/Wi-Fi, etc. radio access networks. FIG. 4 illustrates examples of alternative deployments for the information provider, according to some example embodiments. In certain example embodiments, as illustrated in FIG. 4, the information provider 101 can be implemented in an eNB, a radio application and cloud server (RACS), a RNC, a gateway (GW), or in a standalone middle box where it has access to the in-band user plane packets and can open or accept an off-band connection. These implementations are only examples and the information provider can be implemented in other network elements as well.

The receiver of the information 102 can be any external entity with the scope of protocol/content optimization or providing/adapting services based on network side information, such as a content adaptation gateway, OTT server, advertisement server, etc. The impact of the solution is restricted to the information provider 101 and information receiver 102, i.e., it is transparent to the UE 100, multivendor (i.e. agnostic to the vendors of the network elements in the mobile system) and fully compliant with the specification of the protocols (e.g., TCP) handling the user plane data connections.

As mentioned above, there are two problems that need to be solved by any off-band solution: (1) connection identification; and (2) in-band/off-band information synchronization. Connection identification is required to create a common understanding between the information provider and receiver about which connections are referred to in the off-band communication. The connection identity can only be based on information that can be observed in the user plane packets (protocol fields), i.e., negotiating a connection identity off-band is not possible. Selecting the proper protocol fields, however, is not straightforward in case there is NAT between the information provider (which often resides in the RAN) and the information receiver (which may reside outside of the mobile system, such as in the public Internet). The NAT may be implemented at the PGW/GGSN or by an additional entity on the Gi/SGi interface.

Figure 5:
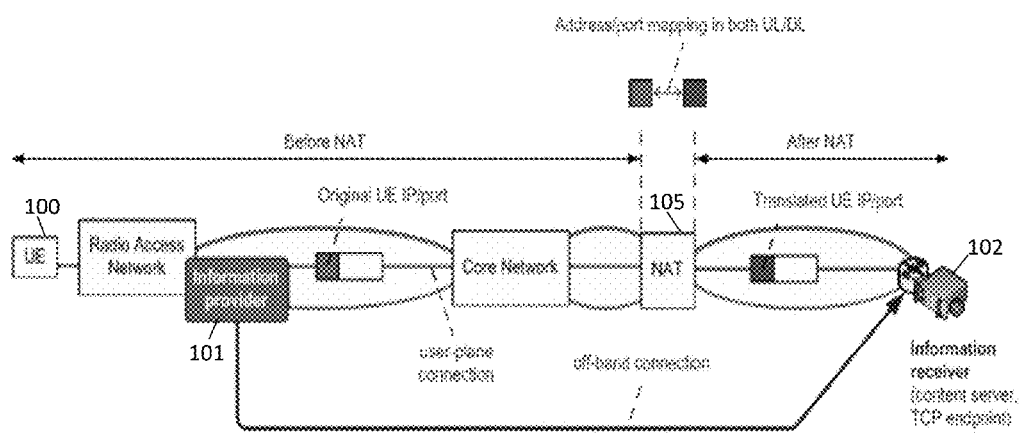
FIG. 5 illustrates a block diagram of a system, according to another example embodiment.

FIG. 5 illustrates an example block diagram depicting the connection identification problem in the presence of NAT 105 where different IP address/port seen by the information provider 101 and information receiver 102. In uplink, the NAT 105 changes the source IP and port numbers (that belong to the UE) from the original pair to a translated pair. In downlink, the destination IP and port numbers are changed from the translated pair to the original pair. Therefore, the information provider 101 always observes the original IP and port numbers whereas the external information receiver 102 always observes the translated pair. This makes the most logical UE identity, i.e., the IP address and port number unusable as a reference in the off-band communication. As these are the only protocol identifiers on the user plane packets that belong to the UE 100 (note that the GTP headers are not visible on the Gi/SGi and above), finding a common reference is needed. Theoretically, the mapping between the original/translated addresses and ports could be learned by communicating with the NAT entity but that would require custom integration, raise additional management and security issues and would not be transparent to the devices apart from the information provider and receiver. Without a proper solution, the connection identification problem makes the off-band communication practically unusable.

A second problem to be solved is the synchronization of the provider and the receiver. The receiver that interprets the received data and modifies its operation based on it should be informed to which past interval the received information refers to. Most notably, the provider must be equipped with means to indicate the scope and validity of the information it is providing. The reason is that in an off-band communication, the transferred information is decoupled from the original packet flow and may arrive asynchronously at the information receiver. Possible reasons are different paths being used for the user plane data flow and the off-band connection or having different priority/treatment on the transport network (e.g., different DSCP class). Having out-of-sync information at the information receiver may lead to actions that are too early or too late, incorrect degree or scope of optimizations, and/or inefficient or even counterproductive decisions.

Thus, certain example embodiments of the invention provide a method that solves both the connection identification and synchronization problems that otherwise would exist if off-band communication is used between a network side entity and an external entity.

Certain example embodiments provide a connection identification scheme that derives a per-connection identity usable by both the information provider and information receiver even in a NAT environment, i.e., not relying on the UE IP and TCP/UDP port fields modified by NAT. Creating a NAT agnostic unique per-connection identity solves the connection identification problem and enables using an off-band communication channel for exchanging information about specific connections.

Additionally, certain example embodiments also provide a synchronization mechanism that enables the mapping of the off-band information to the status of the user plane packet flow (i.e., retaining the association between the source of the information, that is, the user plane packets, and the off-band data). This solves the synchronization problem and enables the information receiver to make accurate decisions and perform efficient optimization.

Further, certain example embodiments provide mechanisms to manage the off-band connection itself. First, some example embodiments are presented for TCP connections, with a straightforward extension to RTP/UDP provided afterwards. The TCP and RTP use cases cover all content delivery mechanisms being practically used and relevant for OTT content and applications. A target of some example embodiments of the invention is the scenario when the information receiver is a TCP/RTP endpoint itself and therefore has the ability to influence the parameters of the user plane connection during its establishment or throughout the whole lifetime of the connection. Additionally, other example embodiments are also usable in the case where the information receiver is not a TCP/RTP endpoint (i.e., it does not terminate the connections itself but only forwards the user plane packets).

The connection identification scheme, according to an example embodiment, may be based on fields in the protocol headers with the following properties: (1) they can be chosen freely and uniquely by the communicating endpoints (most importantly the information receiver); (2) the protocol fields are represented in the user plane packets (i.e., not internal to the communicating endpoints); (3) the protocol fields are not modified by the NAT mechanisms. The first property ensures that the content of such protocol fields can be selected by the information receiver in such a way that is unique among all connections it terminates, thereby being a valid and unique identifier of the individual connections. The second property ensures that the protocol fields may be observed by the information provider at the network side and thus may be included in the off-band communication as a reference to the connections. The third property ensures that both the information provider and information receiver observe the same value in the protocol fields, i.e., the context of the fields is maintained across the NAT.

In an example embodiment, an additional property of the identification mechanism may be that the connection identity transferred through the off-band connection has meaningful semantic for the information receiver only, i.e., the information (even if captured) is not useful for a third party entity. This is fulfilled by the identification mechanism described herein because in order to interpret the existing protocol fields as the connection identity, a device is either the endpoint of the user plane connections (in which case the information is known anyway) or in a position to intercept and monitor the user plane connections. Although, in the latter case, such device may interpret the protocol fields used for connection identification, it could execute much easier attacks (e.g., discarding packets) than simply using the off-band information in a malicious way, therefore knowing this additional information does not increase the level of threat. Also, encrypting the off-band connection prevents any third party from accessing the off-band messages at all.

According to one example embodiment, the protocol fields proposed to be part of the connection identity (and satisfying all the above criteria) may be the TCP Initial Sequence Number (ISN) and possibly the initial TCP TimeStamp (ITS) when the TimeStamp option is present. Neither the ISN nor the TimeStamp are modified by NAT mechanisms as it would break the end-to-end TCP context and make the TCP connection invalid. Since the ISN is part of the mandatory TCP standard, it is always a usable option. In order to create a unique per-connection identity, the information receiver (as a TCP endpoint) should choose a different ISN for each TCP connection. The ISN is part of the first TCP segment sent in the DL, thus the information provider can obtain the same identity for the connections via monitoring the use plane packets. After a user plane connection has been established, the information provider uses the ISN to refer to the individual connection in the information sent via the off-band connection to the information receiver.

The TimeStamp is also a standardized but optional field, which may or may not be used by the TCP endpoints (depending on the TCP implementation and configuration). When present, the initial TimeStamp (also the choice of the information receiver as a TCP endpoint) may also be utilized as the connection identity, in addition to the ISN. As the ISN and initial TimeStamp parameters have only initialization semantics for the communicating TCP entities, freely chosen by the TCP endpoints, example embodiments of the invention provide an identification mechanism that is fully compliant to the TCP standard.

In an example embodiment, the uniqueness of the connection identity is ensured by the information receiver through a controlled ISN and optional ITS selection. According to certain example embodiments, since the usage of TimeStamps is optional and may not be supported by the UE, the information receiver can select a different ISN for each connection so that the ISN alone is already a unique connection identifier. In case the TimeStamp option is used, the information receiver may also have free choice of selecting the ITS. It is noted that equipping the ISN with additional semantics (i.e., connection identification) does not violate the common recommendation towards TCP implementations to choose the ISN in a way that is not predictable (e.g., randomly). As the ISN can be selected from a pool of $2^{32}$ (approximately 4 billion) potential values and the only additional criterion for the ISN mandated by some example embodiments of the invention is to select a value for each new connection that is unique among the established connections, the information receiver may easily implement an unpredictable/random allocation scheme with collision detection to comply with both requirements.

According to an example embodiment, the synchronization problem mentioned above may be solved by including additional connection specific data, such as the TimeStamp (TS) and/or the sequence/ACK numbers of a user plane packet that relates and anchors the off-band information to a specific point of the user plane data flow. An alternative, according to another example embodiment, is to include the sequence/ACK numbers and the TS of the latest packets received by the information provider in the corresponding connection. This annotation enables the information receiver to map the off-band data to the user plane packets or the status of the user plane connections, i.e., reconstruct the context of the received information that would otherwise be lost or delayed/advanced (de-synchronized) on the off-band path. The current TS enables time correlation and the sequence/ACK numbers enable data correlation.

Figure 6:
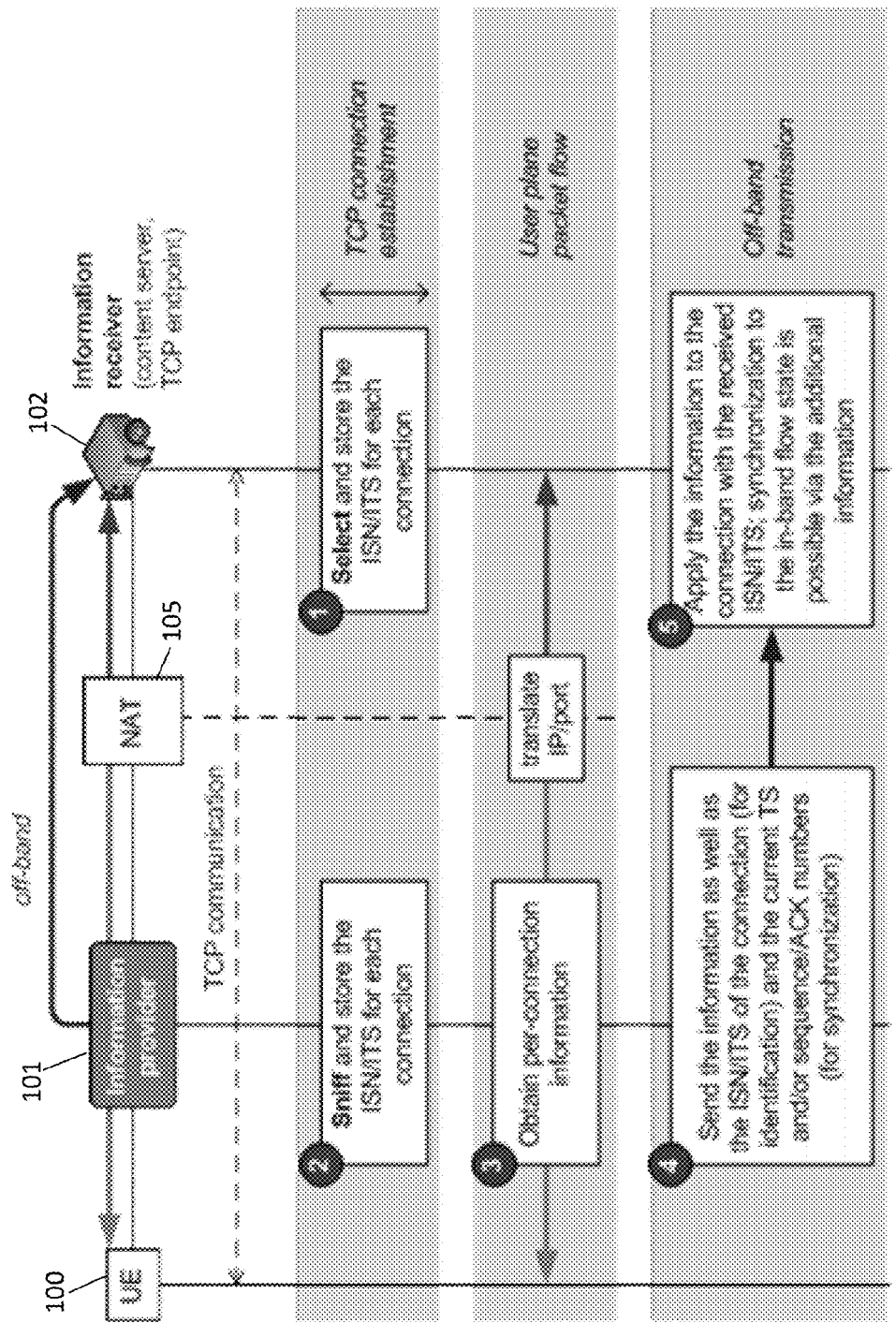
FIG. 6 illustrates a block diagram of a system, according to another example embodiment.

FIG. 6 illustrates an example of the operation of the connection identification as well as the synchronization, according to an example embodiment. As illustrated in FIG. 6, at 1, the information receiver 102 may select and store the ISN/ITS for each connection. At 2, the information provider 101 may sniff and also store the ISN/ITS for each connection. Then, at 3, the information provider 101 may obtain per-connection information which may then be forwarded, for example via a NAT 105, to the information receiver 102. At 4, the information provider 101 may send the information as well as the ISN/ITS of the connection (for identification) and the current TS and/or sequence/ACK numbers (for synchronization) to the information receiver 102. At 5, the information receiver 102 may apply the information to the connection with the received ISN/ITS, and synchronization to the in-band flow state is possible via the additional information received from the information provider 101.

Figure 7:
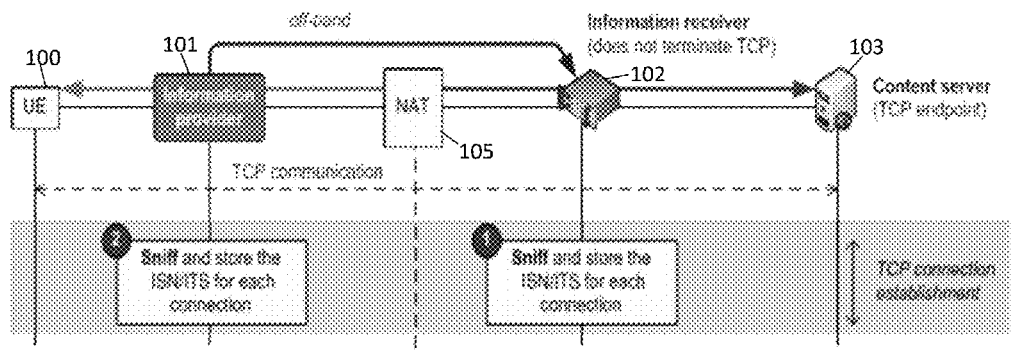
FIG. 7 illustrates a block diagram of a system, according to another example embodiment.

Even in the case where the information receiver 102 is not itself the TCP endpoint of the user plane connections (e.g., it is performing TCP optimization without implementing a TCP proxy functionality), as illustrated in the example of FIG. 7, the connection identification and synchronization scheme may still be used implicitly, without the possibility to actively influence the initial TCP parameters. As illustrated in FIG. 7, the information receiver 102 and information provider 101 can still observe the ISN (and, if used, the ITS) selected by the real TCP endpoint and use them together as the connection identity. As the ISN is expected to be selected randomly by any standards compliant TCP implementation, the probability of encountering an accidental collision (i.e., having established two connections to the same server with the same ISN) due to the lack of controlled ISN selection is negligible in practice. Adding the Time-Stamp (which is usually enabled in modern TCP implementations) as part of the identity reduces the risk of collisions even further.

In addition to TCP, example embodiments of the invention also apply to the identification of real time protocol (RTP) connections over UDP/IP, where the user plane data flow is downlink only and thus the only possibility for communication between the information provider and receiver may be via an off-band connection. The RTP has fields that can be used in an analogous way to the TCP fields. In an example embodiment, for identification, use of the RTP Synchronization Source Identifier (SSRC) is suitable, as it has the same size as the TCP sequence number and is chosen randomly by the source. In an example embodiment, for synchronization, the RTP Timestamp and Sequence Number fields can be used in the same way as the TCP TimeStamp option and sequence numbers.

In fact, according to certain example embodiments, the off-band connection between the information provider and receiver may be based on any protocol. Using authentication and encryption on the off-band connection is possible. The management of the off-band connection (i.e., establishment) can be based on explicit configuration in the information provider and receiver (e.g., list of IP addresses/port numbers on which the information receiver listens) or can be partly based on information visible in the user plane packets (e.g., the IP address of the information receiver integrated with the content server). In the latter case, only the information not present in the user plane connections (e.g., server port number) need to be configured in the information provider.

Some example embodiments apply to the case when TCP or a protocol with suitable fields above UDP is used as the communication protocol between the OTT server and the mobile device for user plane. As outlined above, an example embodiment identifies the connections by using those unique pieces of information that are exchanged between the communicating endpoints at the connection setup and that are left intact by the NAT. The information provider must capture these during the connection setup and use them for identification whenever information is provided to the receiver. The receiver must maintain the same information in a database throughout the whole lifetime of the connection. Some example embodiments refers to the TCP case, as this is the most common scenario, but other example embodiments can be used for UDP/RTP also, as will be discussed below.

Figure 8:
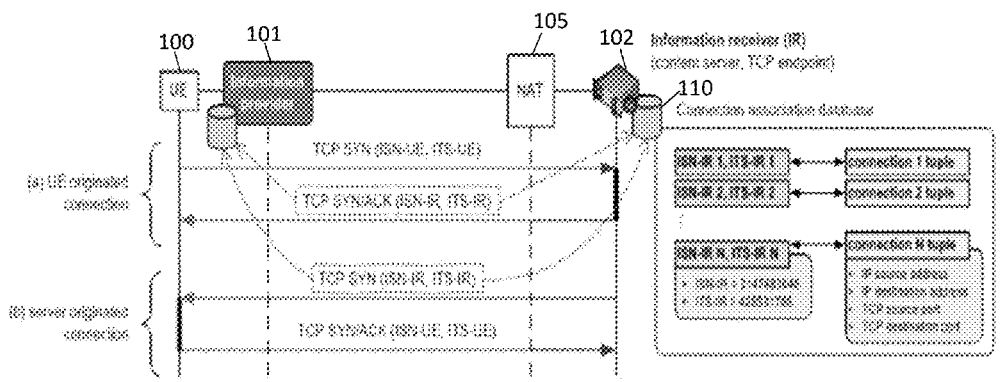
FIG. 8 illustrates a block diagram of a system, according to another example embodiment.

In case the user plane TCP connections are established between the UE and the information receiver, i.e., the information receiver is a TCP endpoint by itself, the information receiver is natively aware of the establishment of new connections. FIG. 8 illustrates an example of the establishment of the connection identity, according to an example embodiment. As illustrated in FIG. 8, the connections are either originated by the UE 100 (usual case), or by the information receiver 102 itself. In both cases, the information receiver 102 is able to choose the ISN and the ITS in the first TCP segment it transmits in the DL direction in each connection. For connections initiated by the UE 100, the first segment sent by the information receiver is the TCP SYN/ACK; whereas for the connections initiated by the information receiver 102, it is the initial SYN segment. The ISN and ITS selected by the information receiver 102 are referred to as ISN-IR and ITS-IR, respectively. The information receiver 102 should choose the values so that their combination is unique for each TCP connection. In one example embodiment, this can be implemented by selecting an ISN value randomly and then checking for collision with the already established connections. The random values may be re-generated until a unique identifier is reached. The result of the process is a unique identifier of the TCP connection. The ISN/ITS are present in the first DL TCP segment for each connection, thus it can be observed by any network element between the UE 100 and the information receiver 102 that has access to the user plane packets, including the information provider 101 (i.e., the identity of the connections is advertised end-to-end). Since there is no successful connection establishment without a successful end-to-end delivery of the first TCP DL segment (SYN or SYN/ACK), it is guaranteed that each connection established in the system has a unique an advertised identity.

If the information receiver 102 is not a TCP endpoint itself, it has no influence on choosing the ISN and ITS values. In that case, the information receiver 102 may passively monitor the user plane packets to detect the establishment of new connections and to obtain the ISN and ITS fields from the first DL TCP segment in each connection. Even though in this situation there is no absolute guarantee on the uniqueness of the combination of the ISN and ITS fields, it is still very likely that their combination is actually a unique identity of the connection due to the large pool from which the ISN is generated and the recommendation that the ISN is chosen randomly by the TCP implementation.

Figure 9:
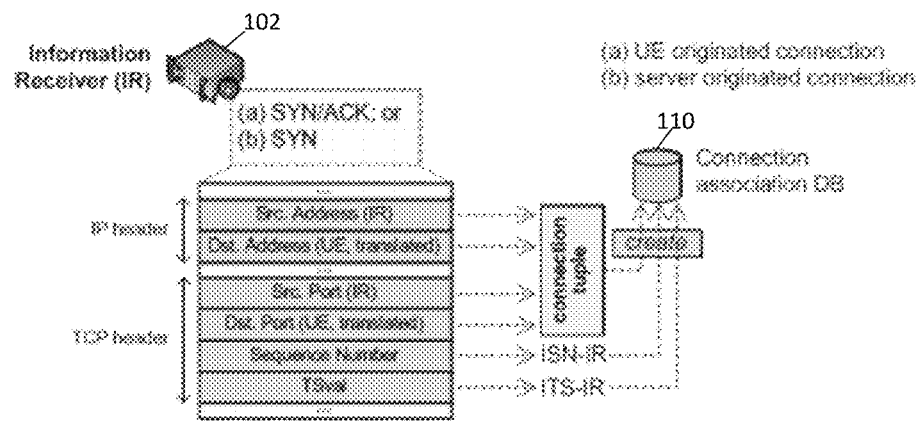
FIG. 9 illustrates a block diagram of a system, according to another example embodiment.

According to an example embodiment, the information receiver 102 may maintain a connection association database 110, which is a mapping between the connection identity based on the ISN and ITS and the connection tuple (IP address and TCP port pairs) used to identify a network communication socket or connection within the information provider 101 (e.g., for the networking API, OS kernel, etc.). This may be needed because the ISN and ITS are no longer present in the user plane packets exchanged after the establishment of the TCP connection, however the connection tuple is always there. This provides an easy mechanism to look up the unique connection identity based on having an actual user plane packet, and also to find the corresponding network socket (usually identified by the connection tuple) in case an off-band information tagged with the unique identity is received. The implementation of the association may be an integral part of the network socket implementation itself, i.e., storing the ISN-IR and ITS-IR within the network socket structure or in the kernel in addition to the other connection parameters. FIG. 9 illustrates an example of the population of a connection association database 110, according to an example embodiment.

In an example embodiment, the information provider 101 may also maintain a similar connection association database as the information receiver 102. As the information provider 102 does not choose any of the parameters related to the connection, it populates the database 110 based on observing the ISN-IR and ITS-IR parameters via user plane packet monitoring, similarly to the information receiver 102 in case it is not a TCP endpoint. The difference between the databases is that the information receiver 102 will have the translated UE IP and TCP port, whereas the information provider 101 has the original UE IP and TCP port identities in case there is NAT in between. However, the tuples at both locations are mapped to the same ISN-IR and ITS-IR identities, creating a unique connection identity across the boundaries of the NAT.

Figure 10:
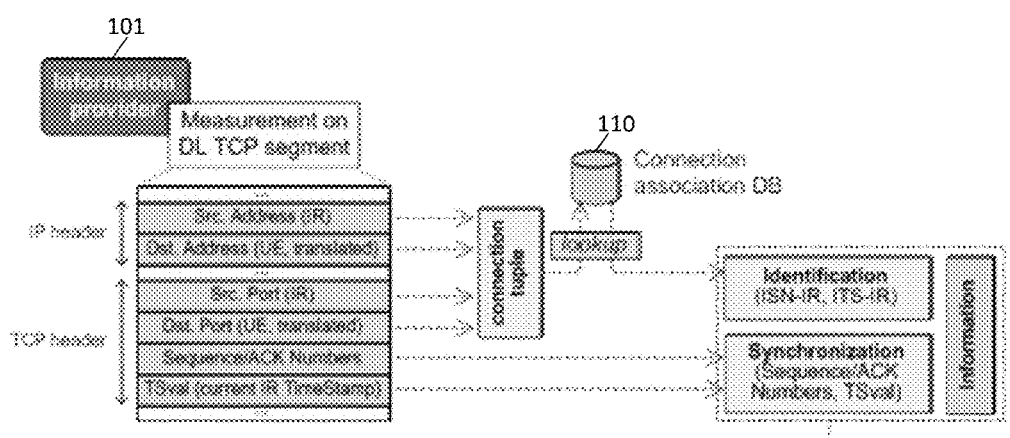
FIG. 10 illustrates a block diagram of a system, according to another example embodiment.

The information provider 101 may transmit messages in the off-band connection to the information receiver 102. The information (e.g., any measurement based on user plane packet monitoring) that belongs to a given connection is extended with the identification of the connection as well as a synchronization information. FIG. 10 illustrates a block diagram depicting the association of the connection identity with in-band measurement data by the information provider 101, according to an example embodiment. The identity may be obtained from the connection association database 110, using the connection tuple (available from any user plane packet) as a key to retrieve the information. The synchronization information contains the current sequence and/or ACK number as well as a selected TimeStamp field observed in the TCP connection in the latest packet. When obtained from DL TCP segments, the sequence number provides synchronization from the downlink data transmission point of view and the ACK synchronizes with the UL data transmission point of view. Additionally, the TSval (TimeStamp value) in the DL TCP segment should be used to inform the information receiver 102 about TCP level time synchronization as the TSval is the latest TCP TimeStamp the information receiver (or the TCP endpoint) has included in the packet. For UL TCP segments, the sequence number provides to position of the UL data transmission and the ACK number provides the position from the DL transmission point of view. Also, from the UL TCP segments the TSecr (TimeStamp Echo Reply) value needs to be taken as the time synchronization information as this value is the copy (echoed by the UE) of the latest TimeStamp originating from the information receiver 102 (or the upstream TCP endpoint). Alternatively, in an example embodiment, if there is time synchronization between the information provider 101 and information receiver 102 (or they both synchronized to the same time source), a real time stamp (independent from the TCP TimeStamp) may be provided for time synchronization.

Example embodiments can be extended to RTP/UDP data connection identification and synchronization based on the mechanisms discussed for TCP. Usually an RTP/UDP data connection is established by the usage of a separate control protocol, e.g., real time control protocol (RTCP), and then the RTP/UDP data flow is unidirectional from the information receiver or content server to the UE. The RTP has analogous protocol fields to TCP both from identification and synchronization point of view. For identification, the RTP SSRC field corresponds to the TCP ISN. However, as opposed to the TCP ISN that is only present in the first DL TCP segment, the RTP SSRC is present in each packet. This makes the connection identification easier as each packet carries its own identity and there is no need to maintain a connection association database at the information provider to map the UDP port and IP address to a given connection identity. However, the information receiver 102 may still maintain the database 110 to look up the resources (e.g., an UDP datagram socket) associated with a given RTP data connection. The RTP has also analogous protocol fields from the synchronization point of view: the RTP Timestamp and RTP sequence number, both present in each DL RTP packet, can be used in the same way as the TCP TimeStamp and sequence/ACK numbers, respectively.

In some example embodiments, the connection identification and synchronization is operational in case of handovers as well. Some relevant cases include when the scope of the information provider is restricted to an area (e.g., to a radio access node such as the LTE eNB) and there is a handover of a UE between two areas (e.g., eNBs) that are covered by two different information providers. Handovers between information providers may result in the connection identity (observed from the initial TCP connection establishment segments) not being automatically observable by the information provider handling the connection after the handover.

In an example embodiment, the information provider adds or in other words enriches the connection identity into each downlink packet of the connection, making the connection identity observable from each downlink packet. During the course of a handover, the downlink packets buffered at the source radio access node (e.g., LTE eNB) are forwarded to the target radio access node (via the X2 interface in case of LTE). These packets can also be intercepted by the information provider covering the target radio access node. As these packets would carry the connection identity via the enrichment, the target information provider can immediately learn the connection identity and seamlessly take over the role of the source information provider. The enriched data may also carry additional information, such as if reports corresponding to the connection should be send to the information receiver, the identity of the information receiver, previous state of the calculations or measurements corresponding to the connection, etc. The success of this mechanism depends on whether there is ongoing data transmission and in-flight data buffered at the source radio access node for each connection when the handover happens. Otherwise, no packets would be forwarded to the target radio access node (at least not for all existing connections).

Therefore, in an example embodiment, a second mechanism can be implemented that guarantees the delivery of the required information from the source information provider to the target information provider. This requires that at least one of the source or target information providers are notified about the handover or can infer that a handover has happened, and a per-bearer explicit context transfer from the source information provider to the target information provider including at least a descriptor of the connections and their corresponding identities. The descriptor of the connections can be based on conventional protocol header fields such as the IP addresses and ports as the information providers have the same view on all header fields (unlike an information provider and an information receiver). The identity is the unique connection identity established by the information receiver. The context transfer may use a logical point-to-point connection established between adjacent information providers or each information provider can have an established connection to a backend concentrator/mediator server, which relays information between two information provider instances in a star topology. The data transfer through the connection can be originated proactively by the source information provider as soon as it is informed about the handover, or originated by the target information provider if it is aware of the handover. The connection synchronization does not require additional mechanisms as it is based on protocol fields available at the source and target information provider similarly, even in case the connection establishment was not monitored by the target information provider.

There are multiple alternatives for managing the establishment of the off-band connection between the information provider 101 and information receiver 102. According to an example embodiment, one solution is that the information receiver 102 acts as a server and the information provider 101 is configured with the IP address and port where the information receiver 102 listens for the off-band connection. This enables the information receiver 102 to listen for the off-band connection at an arbitrary IP address, which can be possibly different from the one used for the in-band user plane data transmission. Another example embodiment is to only configure the port number of the information receiver 102 at the information provider 101, and the information provider 101 learns the IP address based on the destination IP address of the first UL packet in each connection (this address is the IP address of the information receiver in case it is a TCP endpoint). This has the benefit that the information receiver 102 functionality can be flexibly distributed among multiple nodes, with the possibility to add new nodes without having to inform or reconfigure the information provider with new IP addresses. The requirement from the information receiver 102 is that it should listen for the off-band connections at the same IP address that is used for handling the user plane connections. The off-band connection can also be subject to NAT, which is fully transparent to the information provider as it learns the proper IP address of the information receiver 102 (i.e., the one expected by the NAT and which will be translated to the actual IP address of the information receiver 102).

In certain example embodiments, the off-band connection may also use authentication and/or encryption (e.g., via TLS) and any protocol (including, for example, TCP/UDP on the transport layer and any application layer on top, e.g., HTTP, JSON, XML, plain text, etc.). The off-band connection may be prioritized on the transport network (e.g., mapped to a high priority DSCP class) to ensure that the off-band information is conveyed to the information receiver with the lowest latency possible. This is to maintain the relevance of the information sent by the information provider 101, especially if the validity of the information is restricted to a limited time interval, such as real time bandwidth, loss, congestion, etc. related information. Other type of information (e.g., the user identity, which does not change during the connection) is not that sensitive to delay on the off-band path.

Figure 11A:
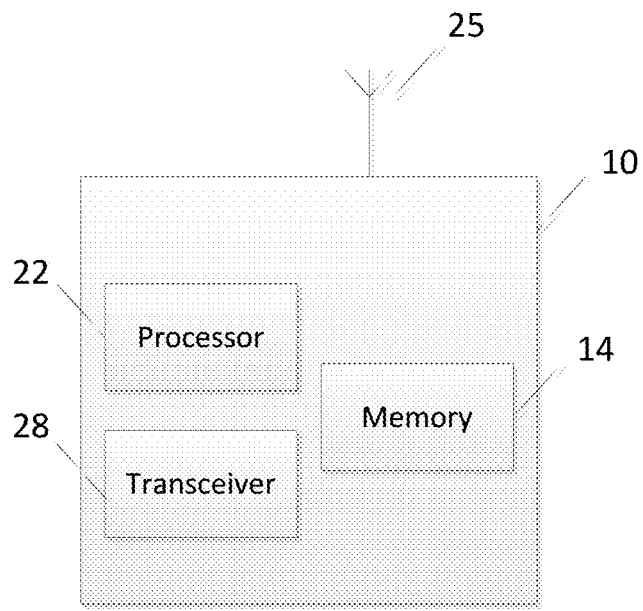
FIG. 11a illustrates a block diagram of an apparatus, according to one example embodiment.

FIG. 11a illustrates an example of an apparatus 10 according to an example embodiment. In an example embodiment, apparatus 10 may be a node, host, or server in a communications network or serving such a network. In an example embodiment, apparatus 10 may be an information receiver. It should be noted that one of ordinary skill in the art would understand that apparatus 10 may include components or features not shown in FIG. 11a.

As illustrated in FIG. 11a, apparatus 10 includes a processor 22 for processing information and executing instructions or operations. Processor 22 may be any type of general or specific purpose processor. While a single processor 22 is shown in FIG. 11a, multiple processors may be utilized according to other example embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can include any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other example embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an example embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one example embodiment, apparatus 10 may be, for example, an information receiver, which may or may not be a TCP endpoint. In this example embodiment, apparatus 10 may be controlled by memory 14 and processor 22 to determine a unique connection identity for an off-band connection with an information provider. In an example embodiment, the unique connection identity may be based on information related to a user plane connection with the information provider. According to one example embodiment, apparatus 10 may be further controlled by memory 14 and processor 22 to store the unique connection identity, receive radio access network information and synchronization information from the information provider, and, using the synchronization information, synchronize at least part of the radio access information with at least part of information sent in the user plane connection.

In one example embodiment, the user plane connection may be a transport control protocol (TCP) connection, and the unique connection identity may include a TCP initial sequence number (ISN) and/or initial TCP time stamps (ITS). According to an example embodiment, the synchronization information may include a time stamp and/or sequence/ACK numbers of a user plane packet.

In another example embodiment, the user plane connection may be a real time protocol (RTP) connection, and the unique connection identity may include a RTP synchronization source identifier (SSRC) and/or RTP time stamp and sequence number.

According to one example embodiment, apparatus 10 may be further controlled by memory 14 and processor 22 to maintain a connection association database configured to store a mapping between the unique connection identity and a connection tuple used to identify a network communication socket or connection with the information provider.

Figure 11B:
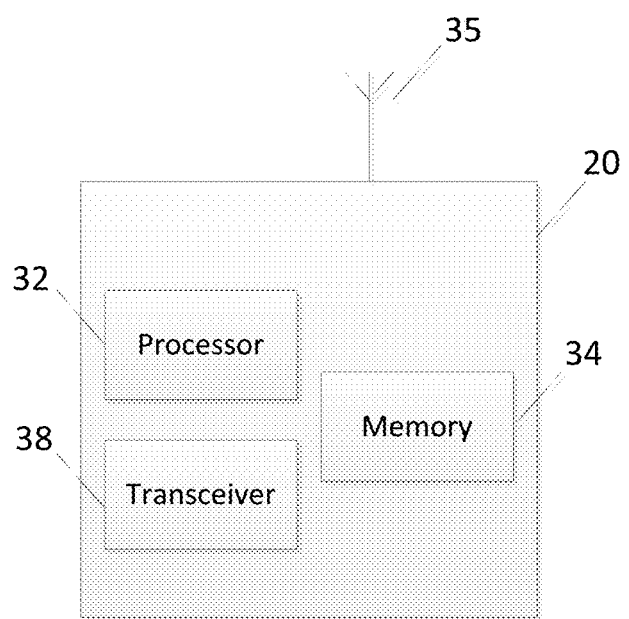
FIG. 11b illustrates a block diagram of an apparatus, according to another example embodiment.

FIG. 11b illustrates an example of an apparatus 20 according to an example embodiment. In an example embodiment, apparatus 20 may be a node, host, or server in a communications network or serving such a network. In one example embodiment, apparatus 20 may be an information provider, for example. It should be noted that one of ordinary skill in the art would understand that apparatus 20 may include components or features not shown in FIG. 11b.

As illustrated in FIG. 11b, apparatus 20 may include a processor 32 for processing information and executing instructions or operations. Processor 32 may be any type of general or specific purpose processor. While a single processor 32 is shown in FIG. 11b, multiple processors may be utilized according to other example embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may include any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include or be coupled to one or more antennas 35 for transmitting and receiving signals and/or data to and from apparatus 20. Apparatus 20 may further include or be coupled to a transceiver 38 configured to transmit and receive information. The transceiver may be an external device, such as a remote radio head. For instance, transceiver 38 may be configured to modulate information on to a carrier waveform for transmission by the antenna(s) 35 and demodulate information received via the antenna(s) 35 for further processing by other elements of apparatus 20. In other example embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an example embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one example embodiment, apparatus 20 may be a node, host, or server in a communications network or serving such a network. For example, apparatus 20 may be an information provider in a network, such as a node B, eNB, radio network controller, access point, or gateway, etc. In this example embodiment, apparatus 20 may be controlled by memory 34 and processor 32 to obtain and store, a unique connection identity, for an off-band connection with an information receiver. The unique connection identity being based on information related to a user plane connection with the information receiver. In an example embodiment, apparatus 20 may be further controlled by memory 34 and processor 32 to send radio access network information and synchronization information to the information receiver, so that at least part of the radio access network information can be synchronized with at least part of user plane information sent in the user plane connection.

In one example embodiment, the user plane connection may be a transport control protocol (TCP) connection, and the unique connection identity may include a TCP initial sequence number (ISN) and/or initial TCP time stamps (ITS). According to an example embodiment, the synchronization information may include a time stamp and/or sequence/ACK numbers of a user plane packet.

In another example embodiment, the user plane connection may be a real time protocol (RTP) connection, and the unique connection identity may include a RTP synchronization source identifier (SSRC) and/or RTP time stamp and sequence number.

According to one example embodiment, apparatus 20 may be further controlled by memory 34 and processor 32 to maintain a connection association database configured to store a mapping between the unique connection identity and a connection tuple used to identify a network communication socket or connection with the information receiver.

Figure 12A:
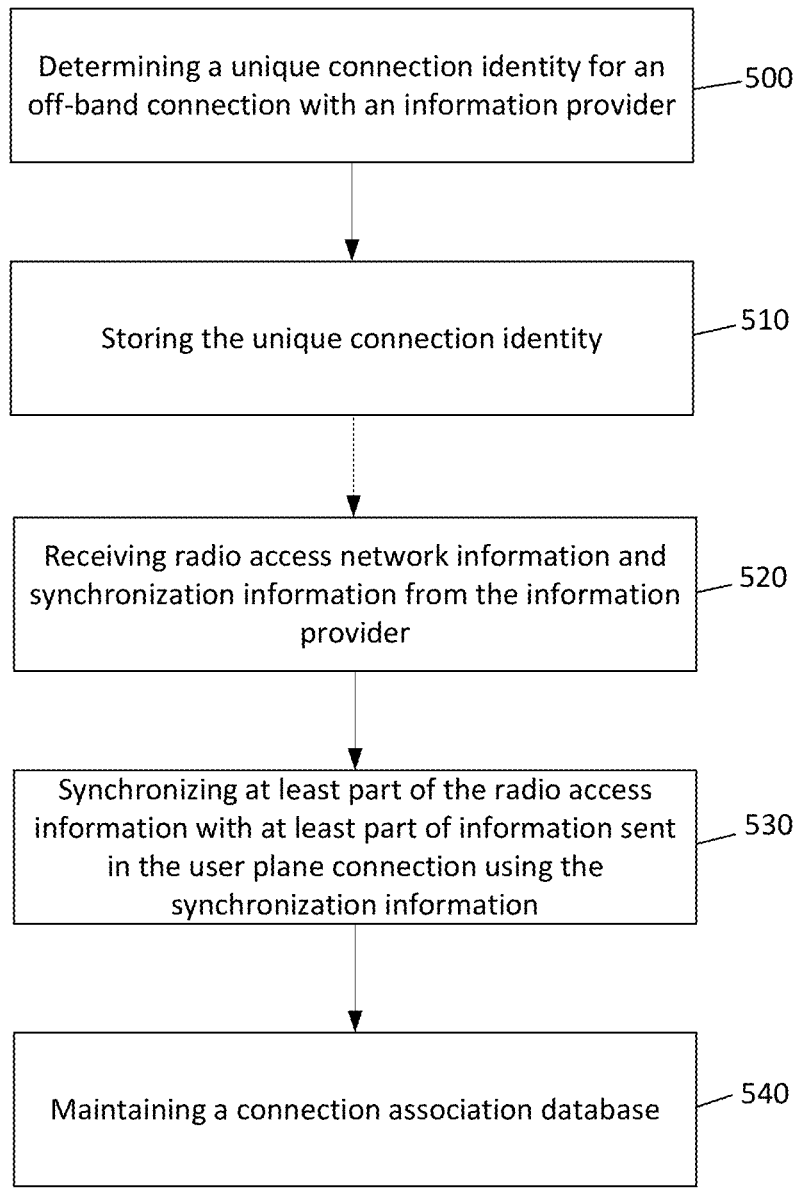
FIG. 12a illustrates a flow diagram of a method, according to an example embodiment.

FIG. 12a illustrates an example of a flow diagram of a method, according to an example embodiment. In one example embodiment, the method may be performed by an information receiver, for example. The method includes, at 500, determining a unique connection identity for an off-band connection with an information provider. The unique connection identity may be based on information related to a user plane connection with the information provider. The method may further include, at 510, storing the unique connection identity and, at 520, receiving radio access network information and synchronization information from the information provider. The method may also include, at 530, synchronizing at least part of the radio access information with at least part of information sent in the user plane connection using the synchronization information. In some example embodiments, the method may further include, at 540, maintaining a connection association database configured to store a mapping between the unique connection identity and a connection tuple used to identify a network communication socket or connection with the information provider.

Figure 12B:
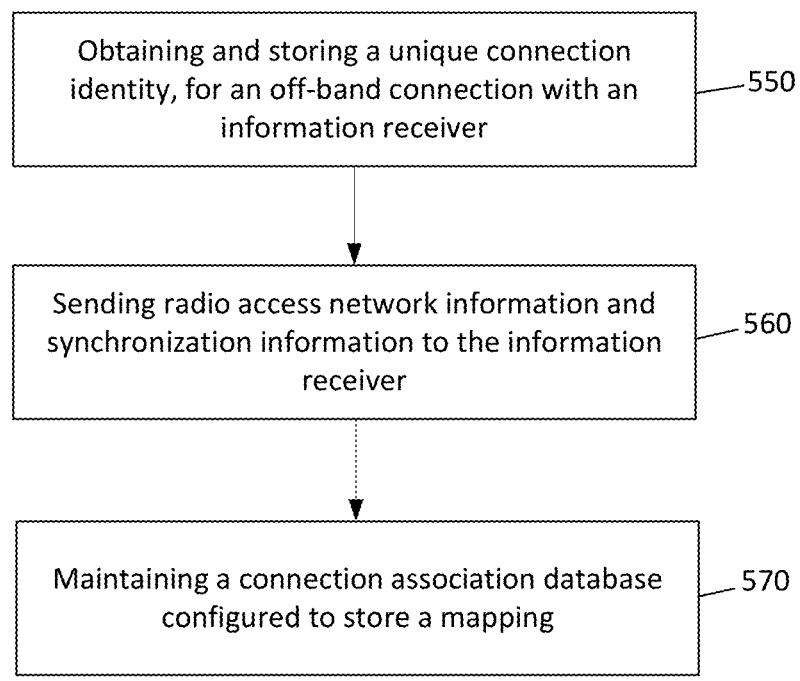
FIG. 12b illustrates a flow diagram of a method, according to another example embodiment.

FIG. 12b illustrates an example of a flow diagram of a method, according to another example embodiment. In one example embodiment, the method may be performed by an information provider, for example. The method includes, at 550, obtaining and storing a unique connection identity, for an off-band connection with an information receiver. The unique connection identity may be based on information related to a user plane connection with the information receiver. The method may further include, at 560, sending radio access network information and synchronization information to the information receiver, so that at least part of the radio access network information can be synchronized with at least part of user plane information sent in the user plane connection. In some example embodiments, the method may further include, at 570, maintaining a connection association database configured to store a mapping between the unique connection identity and a connection tuple used to identify a network communication socket or connection with the information receiver.

One example embodiment is directed to a method which may include determining a unique connection identity for an off-band connection with an information provider. The unique connection identity being based on information related to a user plane connection with the information provider. The method may further include storing the unique connection identity, receiving radio access network information and synchronization information from the information provider, and synchronizing at least part of the radio access information with at least part of information sent in the user plane connection, using the synchronization information.

Another example embodiment is directed to an apparatus which may include at least one processor and at least one memory including computer program code. The at least one memory and computer program code are configured, with the at least one processor, to cause the apparatus at least to determine a unique connection identity for an off-band connection with an information provider. The unique connection identity may be based on information related to a user plane connection with the information provider. The at least one memory and computer program code may be further configured, with the at least one processor, to cause the apparatus at least to store the unique connection identity, receive radio access network information and synchronization information from the information provider, and synchronize at least part of the radio access information with at least part of information sent in the user plane connection, using the synchronization information.

Another example embodiment is directed to a method which may include obtaining and storing a unique connection identity, for an off-band connection with an information receiver. The unique connection identity may be based on information related to a user plane connection with the information receiver. The method may further include sending radio access network information and synchronization information to the information receiver, so that at least part of the radio access network information can be synchronized with at least part of user plane information sent in the user plane connection.

Another example embodiment is directed to an apparatus which may include at least one processor and at least one memory including computer program code. The at least one memory and computer program code are configured, with the at least one processor, to cause the apparatus at least to obtain and store a unique connection identity, for an off-band connection with an information receiver. The unique connection identity may be based on information related to a user plane connection with the information receiver. The at least one memory and computer program code may be further configured, with the at least one processor, to cause the apparatus at least to send radio access network information and synchronization information to the information receiver, so that at least part of the radio access network information can be synchronized with at least part of user plane information sent in the user plane connection.

In some example embodiments, the functionality of any of the methods described herein, such as those illustrated in FIG. 12 discussed above, may be implemented by software and/or computer program code stored in memory or other computer readable or tangible media, and executed by a processor. In other example embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
establishing a user plane connection passing through an information receiver and an information provider without an off-band connection being present between the information receiver and the information provider;
after the establishing of the user plane connection, determining a unique connection identity for the off-band connection between the information receiver and the information provider, the unique connection identity being based on information related to the previously established user plane connection passing through the information receiver and the information provider;
storing the unique connection identity;
receiving radio access network information and synchronization information from the information provider; and
synchronizing at least part of the radio access network information with at least part of information sent in the previously established user plane connection, using the synchronization information.

2. The method according to claim 1, wherein the established user plane connection comprises a transport control protocol (TCP) connection, and wherein the unique connection identity comprises at least one of a TCP initial sequence number (ISN) or initial TCP time stamps (ITS).

3. The method according to claim 1, wherein the synchronization information comprises at least one of time stamp or sequence/ACK numbers of a user plane packet.

4. The method according to claim 1, wherein the established user plane connection comprises a real time protocol (RTP) connection, and wherein the unique connection identity comprises at least one of a RTP synchronization source identifier (SSRC) or RTP time stamp and sequence number.

5. The method according to claim 1, further comprising maintaining a connection association database configured to store a mapping between the unique connection identity and a connection tuple used to identify a network communication socket or connection with the information provider.

6. The method according to claim 1, wherein the radio access network information comprises at least one of bandwidth information, throughput guidance and cell identifier.

7. An apparatus, comprising:
at least one processor; and
at least one memory including computer program code,
the at least one memory and computer program code configured, with the at least one processor, to cause the apparatus at least to
establish a user plane connection passing through the apparatus and an information provider without an off-band connection being present between the apparatus and the information provider;
after the establishing of the user plane connection, determine a unique connection identity for the off-band connection between the apparatus and an information provider, the unique connection identity being based on information related to the previously established user plane connection passing through the apparatus and the information provider;
store the unique connection identity;
receive radio access network information and synchronization information from the information provider; and
synchronize at least part of the radio access network information with at least part of information sent in the previously established user plane connection, using the synchronization information.

8. The apparatus according to claim 7, wherein the established user plane connection comprises a transport control protocol (TCP) connection, and wherein the unique connection identity comprises at least one of a TCP initial sequence number (ISN) or initial TCP time stamps (ITS).

9. The apparatus according to claim 7, wherein the synchronization information comprises at least one of time stamp or sequence/ACK numbers of a user plane packet.

10. The apparatus according to claim 7, wherein the established user plane connection comprises a real time protocol (RTP) connection, and wherein the unique connection identity comprises at least one of a RTP synchronization source identifier (SSRC) or RTP time stamp and sequence number.

11. The apparatus according to claim 7, wherein the at least one memory and the computer program code are further configured, with the at least one processor, to cause the apparatus at least to maintain a connection association database configured to store a mapping between the unique connection identity and a connection tuple used to identify a network communication socket or connection with the information provider.

12. The apparatus according to claim 7, wherein the apparatus comprises an information receiver.

13. A method, comprising:
establishing a user plane connection passing through an information provider and an information receiver without an off-band connection being present between the information provider and the information receiver;
obtaining and storing, by the information provider, a unique connection identity, for the off-band connection between the information provider and the information receiver, the unique connection identity being based on information related to the previously established user plane connection passing through the information provider and with the information receiver; and
sending radio access network information and synchronization information to the information receiver, so that at least part of the radio access network information can be synchronized with at least part of user plane information sent in the previously established user plane connection.

14. The method according to claim 13, wherein the established user plane connection comprises a transport control protocol (TCP) connection, and wherein the unique connection identity comprises at least one of a TCP initial sequence number (ISN) or initial TCP time stamps (ITS).

15. The method according to claim 13, wherein the synchronization information comprises at least one of time stamp or sequence/ACK numbers of a user plane packet.

16. The method according to claim 13, wherein the established user plane connection comprises a real time protocol (RTP) connection, and wherein the unique connection identity comprises at least one of a RTP synchronization source identifier (SSRC) or RTP time stamp and sequence number.

17. The method according to claim 13, further comprising maintaining a connection association database configured to store a mapping between the unique connection identity and a connection tuple used to identify a network communication socket or connection with the information receiver.

18. The method according to claim 13, further comprising adding a connection identity into each downlink packet of a connection, making the connection identity observable by other information providers.

19. The method according to claim 13, wherein, when there is a handover of a user equipment from an area covered by the information provider to an area covered by a target information provider, providing a descriptor of connections and their corresponding identities from the information provider to the target information provider.

20. An apparatus, comprising:
at least one processor; and
at least one memory including computer program code,
the at least one memory and computer program code configured, with the at least one processor, to cause the apparatus at least to
establish a user plane connection passing through the apparatus and an information receiver without an off-band connection being present between the apparatus and the information receiver;
obtain and store, a unique connection identity, for the off-band connection between the apparatus and the information receiver, the unique connection identity being based on information related to the previously established user plane connection passing through the apparatus and the information receiver; and
send radio access network information and synchronization information to the information receiver, so that at least part of the radio access network information can be synchronized with at least part of user plane information sent in the previously established user plane connection.

21. The apparatus according to claim 20, wherein the established user plane connection comprises a transport control protocol (TCP) connection, and wherein the unique connection identity comprises at least one of a TCP initial sequence number (ISN) or initial TCP time stamps (ITS).

22. The apparatus according to claim 20, wherein the synchronization information comprises at least one of time stamp or sequence/ACK numbers of a user plane packet.

23. The apparatus according to claim 20, wherein the apparatus comprises an information provider.

* * * * *